United States Patent
Koike et al.

[11] Patent Number: 5,798,158
[45] Date of Patent: Aug. 25, 1998

[54] LAYERED MOLDING INCLUDING FLUOROPLASTIC LAYER CROSSLINKED WITH RUBBER LAYER

[75] Inventors: Masaki Koike; Atsushi Suzuki; Daisuke Tsutsumi; Masayoshi Ichikawa, all of Aichi-ken, Japan

[73] Assignee: Toyoda Gosei Co., Ltd., Aichi, Japan

[21] Appl. No.: 547,909

[22] Filed: Oct. 25, 1995

[30] Foreign Application Priority Data

Oct. 28, 1994 [JP] Japan .................... 6-289093

[51] Int. Cl.⁶ .................................................. B29D 9/00
[52] U.S. Cl. .................... 428/36.9; 428/36.8; 428/421; 428/423.9; 428/494; 428/492; 428/522; 138/137; 138/140
[58] Field of Search ................... 428/421, 423.9, 428/494, 36.8, 36.9, 492, 522; 138/137, 140, DIG. 3

[56] References Cited

U.S. PATENT DOCUMENTS

| | | |
|---|---|---|
| 4,828,923 | 5/1989 | Nakagawa et al. .............. 428/422 |
| 4,830,920 | 5/1989 | Hayashi et al. .............. 428/421 |
| 5,356,681 | 10/1994 | Ichikawa et al. .............. 428/36.8 |

OTHER PUBLICATIONS

Abstract—Japanese Patent Laid-Open No. 52336-A (1985).

Primary Examiner—Charles Nold
Attorney, Agent, or Firm—Cushman Darby & Cushman IP Group of Pillsbury Madison & Sutro, LLP

[57] ABSTRACT

A layered molding and method for making the same which has excellent antipermeability to gasoline. The layered molding is defined by a fluoroplastic and an epichlorohydrin rubber. The fluoroplastic is a copolymer formed from at least two precursors selected from the group consisting of hexafluoropropylene, tetrafluoroethylene, and vinylidene fluoride, which are selected within a plotted range to preferably form a binary or tertiary composition. The epichlorohydrin rubber contains organic phosphonium. The resulting layered molding does not require an adhesive agent.

16 Claims, 2 Drawing Sheets

LAYERED MOLDING INCLUDING FLUOROPLASTIC LAYER CROSSLINKED WITH RUBBER LAYER

BACKGROUND OF THE INVENTION

1. Field of the Invention

The present invention relates to a layer molding formed of a fluoroplastic layer and a rubber layer and that exhibits excellent anti-permeability to gasoline and alcohol-containing gasoline.

2. Description of the Related Arts

Fuel hoses are commonly used in a fuel circuit of an automobile (including low/high pressure), as well as at service stations as an inlet hose or as an inlet port for introducing gasoline into the gasoline tank of automobiles. In order to prevent fuel from permeating through the fuel hose and spilling onto the user or an automobile, the fuel hose must be prepared from a material that exhibits excellent antipermeability to gasoline. In order to accomplish these objectives, fluoroplastic having a tertiary composition and fluoro-rubber are well-known for their excellent antipermeability to gasoline. However, these materials are very expensive.

It has been discovered that fluoroplastic material maintains a constant anti-permeability level to gasoline irrespective of the thickness of the material, so long as the thickness remains not less than a predetermined minimum operational thickness. By contrast, the anti-permeability of fluoro-rubber is much more dependent upon the thickness of the hose. Accordingly, hoses formed from fluoro-rubber must possess a relatively large thickness, resulting in higher production cost.

In order to provide a fuel hose having excellent antipermeability to gasoline and low production costs, it has been proposed to prepare the layer molding from two layers formed from different materials—e.g., an inner fluoroplastic layer having a small thickness and an outer inexpensive rubber layer (e.g., epichlorohydrin rubber) having excellent weather and cold proofing properties.

However, several problems are associated with the aforementioned layer molding. For example, fluoroplastic does not adequately adhere to inexpensive rubber such as an epichlorohydrin rubber. Accordingly, as shown in FIG. 4, when forming a conventional fuel hose 9, it is necessary to use an adhesive agent 4 for securing a fluoroplastic inner layer 2 and an epichlorohydrin rubber outer layer 3. The fluoroplastic also requires surface treatment for improving its adhesive strength to the rubber outer layer.

SUMMARY OF THE INVENTION

The present invention solves the aforementioned problems associated with the prior art as well as other problems by providing a layer molding formed of a fluoroplastic and an epichlorohydrin-type rubber, such that the resulting layer molding has excellent anti-permeability to gasoline and alcohol-containing gasoline. The resulting layer molding does not require the use of an adhesive agent.

In accordance with one embodiment of the present invention, a layer molding includes a fluoroplastic layer and a rubber layer, which is preferably epichlorohydrin, rubber. The fluoroplastic layer is a copolymer having a composition containing at least two precursor (and preferably three precursors) selected from the group consisting of hexafluoropropylene (HFP), tetrafluoroethylene (TFE), and vinylidene fluoride (VDF), wherein the amount of each precursor is selected such that the fluoroplastic has a composition within a range defined by the plotted coordinates A, B, C, D, E, F and G (shown below) in a graphical representation (see FIG. 1) of a tertiary composition. According to the first embodiment, the epichlorohydrin rubber layer contains organic phosphonium.

|    | HFP | TFE | VDF |
|----|-----|-----|-----|
| A: | 60  | 0   | 40  |
| B: | 40  | 25  | 35  |
| C: | 18  | 32  | 50  |
| D: | 25  | 0   | 75  |
| E: | 0   | 0   | 100 |
| F: | 0   | 100 | 0   |
| G: | 100 | 0   | 0   |

In accordance with a second embodiment of the present invention, an organic phosphonium layer is disposed between the fluoroplastic and rubber layers.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWINGS

The accompanying drawings illustrate embodiments of the present invention. In such drawings.

DETAILED DESCRIPTION OF THE INVENTION

According to one embodiment of the present invention, a copolymer of binary or tertiary composition to be described below is used to prepare a fluoroplastic layer of a layer molding. The layer molding further includes a rubber layer (e.g., epichlorohydrin rubber) preferably containing organic phosphonium.

Figure 1:
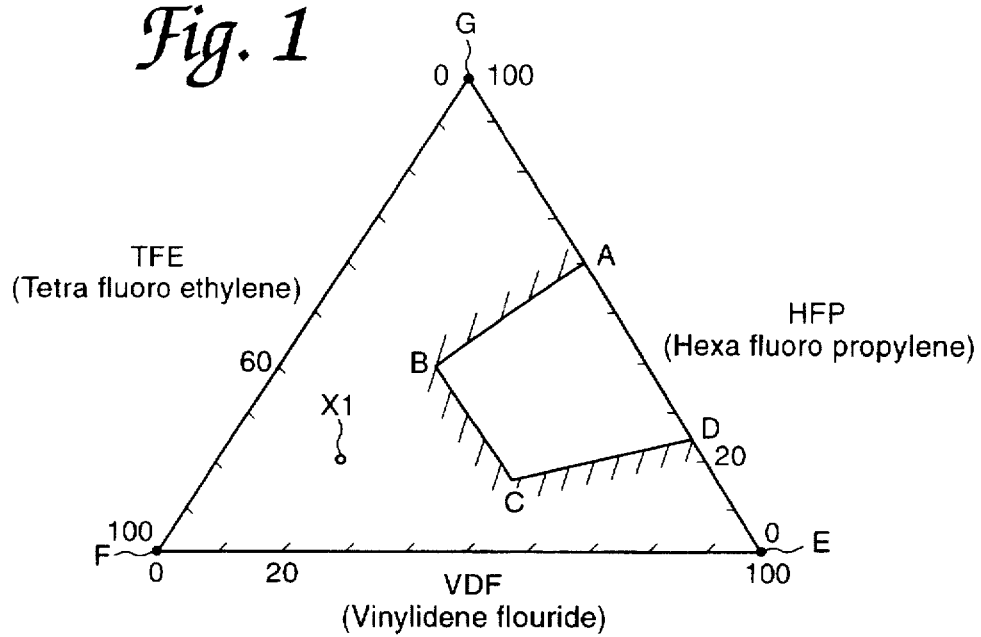
FIG. 1 is a graphical representation of tertiary composition of a fluoroplastic according to one embodiment of the present invention.

The fluoroplastic is preferably prepared from hexafluoropropylene (HFP), tetrafluoroethylene (TFE), and/or vinyliden fluoride (VDF). The composition of the fluoroplastic is preferably selected such that the amount of each constituent falls within the area defined by plotting coordinates A, B, C, D, E, F, and G on an equilateral triangular graph, as shown in FIG. 1.

|    | HFP | TFE | VDF |
|----|-----|-----|-----|
| A: | 60  | 0   | 40  |
| B: | 40  | 25  | 35  |

-continued

|   | HFP | TFE | VDF |
|---|---|---|---|
| C: | 18 | 32 | 50 |
| D: | 25 | 0 | 75 |
| E: | 0 | 0 | 100 |
| F: | 0 | 100 | 0 |
| G: | 100 | 0 | 0 |

If the fluoroplastic has a composition falling outside this range and within the trapezoidal area defined by plotting points A, B, C and D, the resulting composition is a binary or tertiary fluoro-rubber having characteristics of a general rubber. However, as explained above, such a fluoro-rubber does not have the excellent antipermeability properties (with respect to gasoline) that a fluoroplastic of the present invention exhibits. For this reason, the composition is preferably selected outside of this trapezoidal area.

As further mentioned above, the rubber selected for the present invention is preferably epichlorohydrin-type rubber. Exemplary epichlorohydrin-type rubbers include epichlorohydrin homopolymer and copolymer of epichlorohydrin and other epoxides including: epichlorohydrin-alkylene oxide copolymer rubber; epichlorohydrin-allyl glycidyl ether copolymer rubber; and epichlorohydrin-alkylene oxide allyl glycidyl ether tertiary copolymer rubber.

For these copolymers, the alkylene oxide can be either: (1) an ethylene oxide containing epichlorohydrin by 35–98 mol %, ethylene oxide by 0–60 mol %, and allyl glycidyl ether by 0–15 mol %; or (2) a propylene oxide or a mixture of ethylene oxide and propylene oxide containing epichlorohydrin by 10–60 mol %, alkylene oxide by 30–90 mol %, and allyl glycidyl ether by 0–15 mol %. The precise amount selected for each component can be varied in accordance with the desired physical properties of the resulting rubber and the vulcanizer selected.

Also as mentioned above, the rubber layer of the first embodiment contains organic phosphonium. Examples of organic phosphonium are phosphonium benzo triazolete or phosphonium tolyl triazolete linked to the rubber with, for example, the following functional groups: tetrabutyl-, tetraoctyl-, methyl trioctyl-; butyl trioctyl-; phenyl tributyl-; benzyl tributyl-; benzyl tricyclohexyl-; benzyl triethyl-; butyl triphenyl-; octyl triphenyl-; benzyl triphenyl-; diphenyl di(diethyl amine)-; phenyl benzyl di(dimethyl amine)-; trifluoro methyl benzyl-; and tetrafluoro propyl trioctyl-, and the like.

The amount of organic phosphonium to be added is preferably in the range from about 0.5 wt. % to about 10 wt. % of the epichlorohydrin rubber. If less than 0.5 wt. % organic phosphonium is added, the resultant copolymer has a low adhesive strength. On the other hand, if the amount exceeds 10 wt. %, the speed for vulcanizing the epichlorohydrin rubber becomes excessive for practical purposes.

Examples of an organic peroxide vulcanizer suitable for the present invention are: tert-butyl hydro peroxide; p-menthane hydro peroxide; dicumyl peroxide; tert-butyl peroxide; 1,3-bis(tert-butyl peroxi isopropyl) benzene; 2,5-dimethyl-2,5-di(tert-butyl peroxi)hexane, benzoyl peroxide; and tert-butyl peroxi benzoate and the like.

Examples of suitable amine vulcanizers are: (1) aliphatic polyamines including ethylene diamine; hexamethylene diamine; diethylene triamine; triethylene tetra amine; and hexamethylene tetramine, and the like; (2) aromatic polyamines including p-phenylene diamine; cumene diamine; N,N'-dicyamiliden; and 1,6-hexane diamine, and the like; and (3) amine carbacurine acids including ethylene diamine carbamate; and hexamethylene diamine carbamate, and the like.

Alternatively, an epichlorohydrin rubber vulcanizer such as ethylene thiourea, triazine, and the like, are suitable. Examples of the ethylene thiourea vulcanizers are: 2-mercaptoimidazoline, trimethyl thiourea, and N,N'diethyl thiourea, and the like.

The amount of the vulcanizer to be used can be varied in accordance with the intended use of the layer molding. It is, however, generally selected within the range from about 0.1 wt. % to about 5 wt. % of the rubber.

A metal oxide or hydroxide, such as, for example, MgO and $Ca(OH)_2$, can be added as an acid accepting agent with the vulcanizer, preferably in an amount ranging from about 1 wt. % to about 50 wt. % of the rubber.

In a method for manufacturing a layer molding of the present invention, the fluoroplastic layer and the epichlorohydrin rubber layer are produced and placed adjacent with each other through, for example, a co-extrusion technique. The layers are arranged to define a multi-layered construction, after which the layers are vulcanized.

The vulcanization method is preferably conducted by effecting steam vulcanization at about 150° C. for about 30 minutes to about 60 minutes. Vulcanization of the organic phosphonium facilitates molecular crosslinking of both the fluoroplastic and the epichlorohydrin rubber at a contact interface positioned therebetween, resulting the two layers being secured firmly.

A second embodiment of the present invention provides a layer molding formed of a fluoroplastic layer and an epichlorohydrin rubber layer as described above, wherein the fluoroplastic layer is formed of hexafluoropropylene (HFP), tetrafluoroethylene (TFE), and vinylidene fluoride (VDF) as a copolymer having a composition within a range defined by plotting coordinates A, B, C, D, E, F and G (shown above) in a graphical representation (see FIG. 1) of a binary or tertiary composition. According to the second embodiment of the present invention, at least one surface of the fluoroplastic layer or the epichlorohydrin rubber layer has a coating layer of an organic phosphonium coated thereon.

More specifically, the fluoroplastic or epichlorohydrin layer preferably has a coating layer of organic phosphonium formed at the interfacing surfaces of the fluoroplastic and rubber layers.

The preferred composition of the fluoroplastic is the same as that described above with respect to the first embodiment of the present invention. Similarly, the epichlorohydrin rubber and the organic phosphonium are the same as those identified above for the first embodiment of the present invention. However, unlike the first embodiment of the present invention, the epichlorohydrin rubber of the second embodiment does not contain organic phosphonium (although the presence of organic phosphonium in the rubber is not forbidden). The vulcanizer and acid accepting agent are the same as those used in the first embodiment.

In one preferred method for manufacturing the layer molding of the present invention, the fluoroplastic layer is extrusion molded. Then the organic phosphonium coating layer is preferably positioned between fluoroplastic layer and the epichlorohydrin rubber layer, which is also preferably formed by extrusion molding. Finally, an additional fluoroplastic layer can be formed thereon for vulcanization.

Steam vulcanization is preferably conducted at about 150° C. for about 30 minutes to about 60 minutes. In the above vulcanization, crosslinking action of the organic phosphonium facilitates molecular crosslinking between the fluoroplastics and the epichlorohydrin rubber at the contact interface therebetween, resulting in firm adherence between the two layers.

The layer molding of the first embodiment employs a fluoroplastic of binary or tertiary composition within the above-described graphical range. The permeability of the layer molding to gasoline and alcohol-containing gasoline is preferably about 0.2 mg·mm/(cm$^2$·day) or less, thus providing the layer molding with excellent antipermeability to gasoline.

The permeability to gasoline is measured through a cup method. According to this method, a predetermined amount of gasoline is disposed in a metal cup, and the cup is sealed by a sample of layer molding of the present invention. Next, the metal cup is inverted so that the sample of layer molding is positioned under the cup and the gasoline rests on top of and is supported by the sample. The metal cup, gasoline, and sample are then weighed. The filled cup and sample are maintained at a constant temperature for a fixed amount of time, and the weight of the filled cup and sample are periodically measured. The weight of the filled cup decreases with the passage of time due to the permeation of gasoline through the sample of layer molding. After the passage of approximately 3 to 7 days, the permeation of gasoline through the sample reaches an equilibrium state, at which weight decreases at a constant rate.

The permeability is determined by multiplying the amount of gasoline (mg) that permeates during the equilibrium state by the sample thickness (mm), and then dividing by the unit surface area (cm2) of the sample and the time (day) for which the same remained in the metal cup during the equilibrium state.

Because the layer molding prepared in accordance with the first embodiment of the present invention employs an epichlorohydrin rubber containing organic phosphonium, adherence between the rubber and fluoroplastic layers can be accomplished through the above-described vulcanization without using an adhesive agent. Accordingly, the need to alter the fluoroplastic surface (e.g., surface treatment) for the purpose of intensifying the adhesive property of the adhesive agent is eliminated.

The second embodiment of the present invention, in which an organic phosphonium is included as a coating layer, provides similar advantages and the further advantage of broadening the selection of suitable epichlorohydrin rubbers. For example, combining the organic phosphonium with the rubber and vulcanizer (Zisnet F (trimercapt-S-triadine)) of samples R2, R4, and R6 in accordance with the first embodiment of the present invention can result in a rubber layer having a short scorch time. However, according to the second embodiment of the present invention, the organic phosphonium is applied as a coating layer, and not mixed with the vulcanizer into the rubber layer (although such mixture is not precluded) as in the first embodiment. Accordingly, concerns over compatibility of organic phosphonium on the one hand and vulcanizer and epichlorohydrin rubbers on the other hand are not as great.

This application claims priority of Japanese Application No. 289,093 filed on Oct. 28, 1994, which is incorporated herein by reference.

The present invention is further described in the following non-limiting Examples, which are merely illustrative of various embodiments of the present invention.

EXAMPLES

Examples 1-3

In Examples 1–5 and Comparative Examples C1–C3, the adhesive strength between a fluoroplastic layer and several different epichlorohydrin rubber layers (i.e., samples R1 to R6 prepared by mixing compounds shown in Table 1) are investigated.

For each of these examples, the fluoroplastic selected has the tertiary composition expressed as a point X1 shown in FIG. 1 (THV500G produced by 3M Co., hereinafter referred to as "THV"). The THV has an excellent anti-permeability to gasoline and alcohol-containing gasoline, exhibiting a permeability of 0.1 mg·mm/(cm$^2$·day).

Table 2 lists physical properties of six types of rubbers (sample Nos. R1–R6) shown in Table 1. Also listed for each of the samples are experimental results indicating the physical properties of the rubber during vulcanization at 170° C. for 10 minutes through a test based on Japanese Industrial Standards (JIS) K6301, which is incorporated herein by reference.

TABLE 1

(Epichlorohydrine rubber) [Unit: wt. %]

| Compound | R1 | R2 | R3 | R4 | R5 | R6 |
|---|---|---|---|---|---|---|
| Zecron 3101 *1 | 64.00 | ← | 64.00 | ← | 64.00 | ← |
| Zecron 3101R *2 | 36.00 | ← | 36.00 | ← | 36.00 | ← |
| Ceast G116 *3 | 40.00 | ← | 55.00 | ← | 40.00 | ← |
| RS107 *4 | | | 12.00 | ← | | |
| TP-95 *5 | 10.00 | ← | | | 10.00 | ← |
| Splender R300 *6 | 2.00 | ← | 2.00 | ← | 2.00 | ← |
| Noclack NBC *7 | 1.00 | ← | 1.00 | ← | 1.00 | ← |
| MgO #1000 | 3.00 | ← | 3.00 | ← | 3.00 | ← |
| CaCO$_3$ | 5.00 | ← | 5.00 | ← | 5.00 | ← |
| Antimony trioxide (Flame retarder) | | | 5.00 | ← | | |
| Ca(OH)$_2$ | | | 5.00 | ← | 5.00 | |
| CaO | | | 2.50 | ← | | |
| Sanceller 22C *8 | 1.00 | | 1.00 | | 1.00 | |
| Nockceller CZ-G *9 | 1.00 | | 1.00 | | 1.00 | |
| Zeonet PB *10 | 1.00 | | 1.00 | | 1.00 | |
| Splender R300 *6 | 1.00 | 1.00 | 1.00 | 1.00 | 1.00 | 1.00 |
| Zisnet F *11 | | 1.19 | | 1.19 | | 1.19 |
| Santguard PVI-DS *12 | | 1.00 | | 1.00 | | 1.00 |

*1: Epichlorohydrine-alkyleneoxide-allyl glycidyl ether terpolymerization rubber (Nippon Zeone), Rubber content
*2: Same as above
*3: MAF Carbon black (Tokai Carbon), Reinforcement agent
*4: Di(butoxy-ethoxy-ethyl)adipate (ASAHI DENKA KOGYO K.K.), Plasticizer
*5: Same as above (Morton International Co., Ltd.), Plasticizer
*6: Sorbitan mono stearate (Kao Corporation), Processing aid
*7: Nickel dibutyl dithiocarbamate (Ouchi Shinko Kagaku), Aging inhibitor
*8: Ethylene thiourea (Sanshin Kagaku), Vulcanizer
*9: N-cyclohexyl-2-bezothiazyl-sulfenamide (Ouchi Shinko Kagaku), Vulcanizer
*10: Organic phosphonium (Nippon Zeone)
*11: 2,4,6-trimercapto-S-triadine (Nippon Zeone), Vulcanizer
*12: N-(cyclohexylthio)phthalimide (Nippon Monsant), Retarder

TABLE 2

(Epichlorohydrine rubber)

| Physical value | | R1 | R2 | R3 | R4 | R5 | R6 |
|---|---|---|---|---|---|---|---|
| Mooney scorch | | | | | | | |
| MV | — | 35.4 | 34.5 | 48.5 | 56.6 | 32.4 | 36.2 |
| t5 | min. | 6.0 | 5.5 | 3.7 | 2.6 | 4.1 | 3.0 |
| tΔ30 | min. | 1.7 | 2.7 | 1.6 | 1.0 | 1.8 | 1.4 |
| Curast 170° C. | | | | | | | |
| MH | kg. | 12.4 | 21.8 | 27.6 | 25.8 | 16.2 | 21.8 |
| T10 | min. | 1.9 | 2.9 | 2.0 | 1.4 | 2.0 | 1.9 |

TABLE 2-continued (Epichlorohydrine rubber)

| Physical value | | R1 | R2 | R3 | R4 | R5 | R6 |
|---|---|---|---|---|---|---|---|
| T90 | min. | 12.5 | 14.8 | 16.1 | 13.9 | 15.4 | 13.2 |
| Ordinary physical property | | | | | | | |
| TB | MPa | 11.7 | 10.7 | 12.7 | 9.4 | — | — |
| EB | % | 516 | 345 | 299 | 217 | — | — |
| M100 | MPa | 2.0 | 3.0 | 4.7 | 5.2 | — | — |
| M300 | MPa | 7.1 | 9.6 | 0.0 | 0.0 | — | — |

Figure 5:
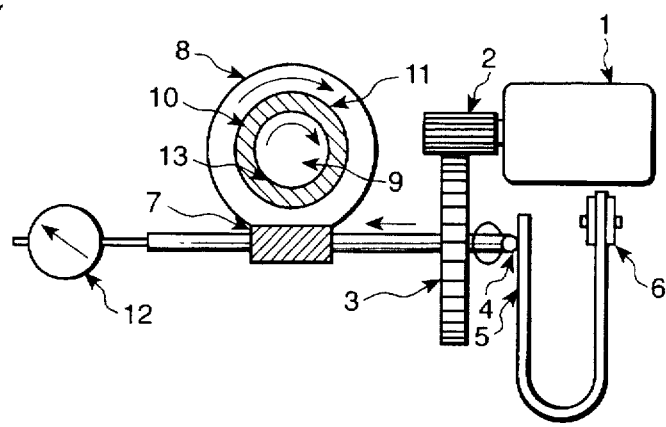
FIG. 5 shows an embodiment of a Mooney viscometer.

In Table 2, TB denotes a tensile strength, EB denotes a tensile break elongation, M100 denotes a 100% modulus, and M300 denotes a 300% modulus. Mooney scorch refers to scorch testing with a Mooney viscometer, which is generally known to those skilled in the art. An embodiment of a Mooney viscometer (also referred to as a rotary plastometer) is shown in FIG. 5, in which the Mooney viscometer includes a motor 1, pinion 2, major gear 3, ball bearing 4, U-shaped spring 5, stator 6, worm gear 7, worm wheel 8, rotor 9, rubber sample 10, die 11, dial gauge 12, and plunger 13. According to this embodiment, the rotor 9 is placed in contact with a rubber sample and then set into the center of the die 11. Preferably, the rotor 8 is L-shaped or S-shaped (especially for viscosities exceeding 150). The die 11 is closed and the rotor 9 is rotated at about 2 rpm after heating for about 1 minute. The resiliency of the rubber sample produces a torque in the opposite direction to the rotation of the rotor 9. The resultant torque is received by the U-shaped spring 5, which is measured with a dial gauge 12 or automatically recorded.

Figure 6:
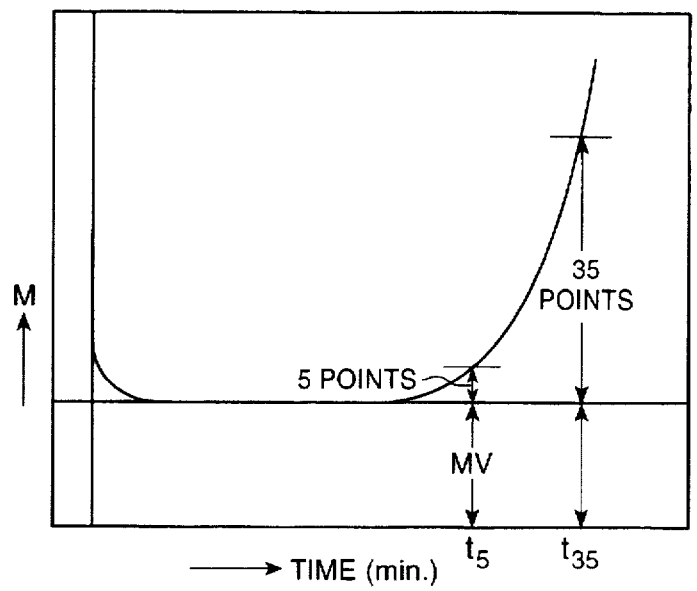
FIG. 6 shows a graphical representation of the relationship between time and Mooney viscosity.

Testing is usually conducted at 125° C. or 145° C. MV denotes the minimum viscosity value of unvulcanized rubber measured with the Mooney viscometer at 145° C., which is usually determined over the first four minutes (see FIG. 6). As further shown in FIG. 6, t5 (or t35) denotes the time measured at 145° C. required to increase the gauge on a Mooney viscometer by 5 points (or 35 points) from the MV. tΔ30 represents t35–t5.

In Table 2, Curast 170° C. refers to the vulcanization testing at 170° C. with a curast meter (or "cuometer"). The present invention utilizes a "Curastmeter 111", which is manufactured by Nihon Synthetic Rubber Co. Curast meters are utilized for determining optimum vulcanization conditions by examining such properties as tensile strength, tensile stressing, elongation, and hardness. In particular, an unvulcanized rubber sample and a vulcanizer are placed into a pressurized sealed chamber (similar to that of the above-described Mooney viscometer) of the curast meter. A rotary shearing force is then exerted on the sample at an increased temperature to apply stress and strain to the sample. Over the course of sample vulcanization, the mechanical properties of the sample are measured by a load cell and recorded.

Figure 7:
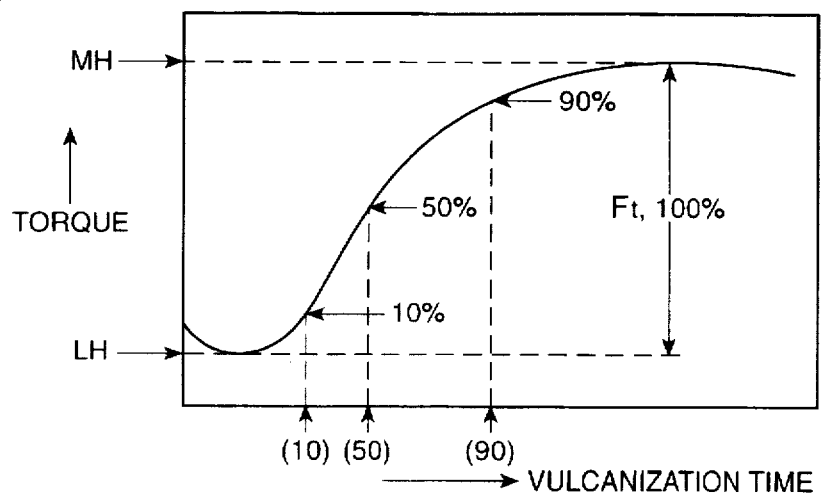
FIG. 7 shows a graphical representation of the relationship between vulcanization time and torque.

These mechanical properties can be graphed as a vulcanization curve, as illustrated in FIG. 7. The abscissa is vulcanization time (minutes) and the orginate torque (Kg·cm). F1 defines the interval between the minimum torque value (LH) and the maximum torque value (MH). T10 designates the vulcanization time required for the rubber sample to undergo 10% vulcanization (i.e., at LH+0.10×F1). T90 designates the vulcanization time required for the rubber sample to complete 90% vulcanization (i.e., at LH+0.90×F1). This curve can be of assistance in determining appropriate vulcanizers and vulcanization conditions.

In order to measure adhesive strength between the rubber and THV layers, both materials were cut into strips (1 mm thick×25 mm wide×100 mm long). A surface of the THV strip was degreased with ethanol. A releasing agent was applied to one end of the THV piece to make a tong hold for a peel test. The rubber layer was laid on the THV layer and a pressure of 20 kg/cm² was applied thereto for pressing with a hard press unit for 5 seconds and at room temperature. The pressed layers were placed in a steam vulcanizing device under pressure of 4–5 kg/cm² and steam vulcanized for 60 minutes. The resultant test sample piece was then pulled at 50 m/min by an autograph (e.g., a device manufactured by Shimazu Seisakusho (type AG-500B)) for testing tensile strength. Based on the maximum load, the peel strength was measured and breaking mode was examined. The results are shown in Table 3. In particular, Table 3 lists the rubber samples, metal compounds added as an acid accepting agent, the presence/absence of organic phosphonium or an organic phosphonium coating layer, and adhesive strength between the rubber and THV with respect to each example and comparative example.

As Table 3 shows, Examples 1–3, in which the rubber contained organic phosphonium, exhibited superior adhesion strength between the THV and rubber layers as the result of vulcanization alone (i.e., without an adhesive agent). By contrast, comparative examples C1–C3, which included rubber layers containing no organic phosphonium, did not exhibit any adhesion between THV and rubber layers.

Among Examples 1–3, sample R1 containing only MgO as an acid accepting agent exhibited the highest adhesive strength. Sample R5 (example 3) containing MgO and Ca(OH)2 exhibited a lower adhesive strength than that of sample R1, while sample R3 (example 2) containing all of the acid accepting agents (MgO, Ca(OH)2 and MgO) resulted in the lowest adhesive strength among examples 1–3.

TABLE 3

| | Examples | | | Comparative Examples | | | Examples | |
|---|---|---|---|---|---|---|---|---|
| | 1 | 2 | 3 | C1 | C2 | C3 | 4 | 5 |
| Rubber Metal compound | R1 | R3 | R5 | R2 | R4 | R6 | R2 | R6 |
| Ca(OH)₂ | — | ○ | ○ | — | ○ | ○ | — | ○ |
| CaO | — | ○ | — | — | ○ | — | — | — |
| MgO | ○ | ○ | ○ | ○ | ○ | ○ | ○ | ○ |
| Organic phosphonium | Y | Y | Y | N | N | N | N | N |

TABLE 3-continued

|  | Examples | | | Comparative Examples | | | Examples | |
| --- | --- | --- | --- | --- | --- | --- | --- | --- |
|  | 1 | 2 | 3 | C1 | C2 | C3 | 4 | 5 |
| contained in rubber (Yes/No) | N | N | N | N | N | N | Y | Y |
| Organic phosphonium coating layer (Yes/No) | | | | | | | | |
| Adhesive strength to THV (N/mm²) | 73 | 26 | 38 | No adhesion | No adhesion | No adhesion | 31 | 7 |
| Destroy mode | Rubber destroyed | ← | ← | | | | Rubber destroyed | Rubber/ Interface destroyed |

Examples 4 and 5

Examples 4 and 5 used rubber samples R2 and R6, both containing no organic phosphonium and the same THV composition employed in Examples 1–3, for evaluating the adhesive strength of the organic phosphonium coating layer.

The sample size and preparation procedures used in the Examples 4 and 5 were the same as those of Examples 1–3. Prior to vulcanization, an organic phosphonium (Zeone tPB produced by Nippon Zeone) layer was disposed on the THV surface; then, the rubber layer was disposed on the opposite side of the organic phosphonium layer. Measurement of the adhesive strength was also executed in the same manner as in Examples 1–3.

As shown in Table 3, Examples 4 and 5 show that the rubber and THV strongly adhered to each other after vulcanization. Similar to Examples 1–3, the sample R2 containing a metal compound MgO exhibited a higher adhesive strength than that of the sample R6 containing MgO and $Ca(OH)_2$.

Comparative Examples C1–C3

Comparative Examples C1, C2, and C3 contained the same compositions as Examples 1, 2, and 3, respectively, with the exception that no organic phosphonium was introduced into the rubber in the comparative examples. In addition, Comparative Examples C1 and C3 contained the same compositions as Examples 4 and 5, respectively, with the exception that no organic phosphonium coating layer was included in the comparative examples. As shown in Table 3, because no organic phosphonium was introduced in the comparative examples, the rubber and THV did not adequately adhere to one another. This shows that the molding layer of the present invention, which includes either organic phosphonium contained in the rubber layer or a separate coating layer of the organic phosphonium, is effective to facilitate vulcanizing adhesion between the rubber and THV.

Comparative Examples C4–C6

Comparative Example C4 included sample R3 as a rubber layer, while Comparative Examples C5 and C6 both contained sample R2 as the rubber layer. Further, Comparative Examples C4 and C5 both contained ETFE (copolymer of ethylene and TFE) as the fluoroplastic layer, while Comparative Example C6 contained THV (represented as the composition X1 as shown in FIG. 1 and having a permeability to gasoline of 0.1 mg mm/(cm² day)) as the fluoroplastic layer. The above-described rubbers and fluoroplastics were formed into a layer molding without using an adhesive agent. The adhesive strength of each comparative example was evaluated in the same manner as for Examples 1–3.

Comparative Examples C4 to C6 used the same procedure for preparing the test samples as that used in Examples 1–3. Prior to the pressing process, the fluoroplastic layer surfaces of Comparative Examples C5 and C6 were altered by Corona discharge treatment for 1 minute at electric power of 83 W. No organic phosphonium was introduced into or coated on the rubber layer. According to this discharge treatment, a hydrogen atom is released from an ethylene chain of ETFE. The radical reacts with oxygen and the like, producing C=O, which improves the wetting capability of an adhesion agent. Such a technique is well known in the art.

The adhesive strength was then evaluated by using the above-prepared test samples.

Referring to Table 4, Comparative Examples C5 and C6, which contained no organic phosphonium in the rubber, did not exhibit any adhesive strength, irrespective of the difference of fluoroplastic type or surface alteration thereof. Although Comparative Example C4 contained organic phosphonium in the rubber, no adhesion was observed because it contained no VDF or HFP component in the fluoroplastic composition.

TABLE 4

|  |  | Comparative Examples | | |
| --- | --- | --- | --- | --- |
|  |  | C4 | C5 | C6 |
| Rubber | R2 |  | O | O |
|  | R3 | O |  |  |
| Fluoroplastic | THV |  |  | O |
|  | ETFE | O | O |  |
| Surface alteration of fluoroplastic (Yes/No) |  | N | Y | Y |
| Adhesive agent (Yes/No) |  | N | N | N |
| Adhesive strength to THV |  | No adhesion | No adhesion | No adhesion |

Example 6

Figure 2:
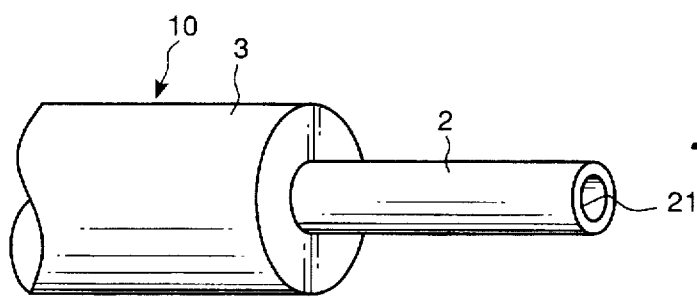
FIG. 2 is a perspective view of a fuel hose prepared in accordance with Example 6.

As shown in FIG. 2, a layer molding of this example has a tubular member 10 having an inner tube 2 formed of the fluoroplastic provided with a bore 21 therein along the length of the inner tube 2, and an outer tube 3 formed of an epichlorohydrin rubber. THV was employed as the fluoroplastic (similar to Example 1). The sample R1 shown in Table 1 was employed as the epichlorohydrin rubber.

In manufacturing the tubular member of Example 6, the THV and the sample rubber R1 were co-extrusion molded into a 2-layered molding and then steam vulcanized.

As shown by Example 6, a tubular member (e.g., a fuel hose) has the same excellent adhesive-strength and antipermeability to gasoline as the above-described film of Example 1.

Example 7

Figure 3:
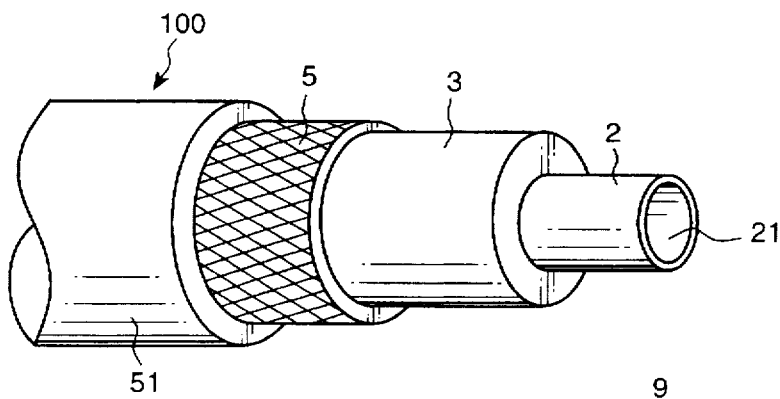
FIG. 3 is a perspective view of a fuel hose prepared in accordance with Example 7.
Figure 4:
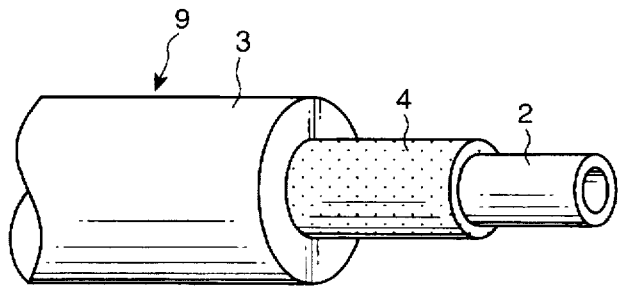
FIG. 4 is a perspective view of a conventional fuel hose.

As shown in FIG. 3, a layer molding for Example 7 is in the form of a tubular member 100 having an inner tube 2 formed of the fluoroplastic provided with a bore 21 therein along the length thereof, and an outer tube 3 formed of epichlorohydrin rubber. The outer tube 3 is further sequentially covered with a thread layer 5 (for alleviating excessive pressure on the tubular member) and a skin layer 51 (for protecting the thread layer 5 and improving permeability). THV was again employed as the fluoroplastic (as in Example 1) and the sample rubber R1 was employed as the epichlorohydrin rubber (shown in Table 1).

The thread layer 5 is formed by winding a thread made of polyester around the outer tube 3 so as to define a net structure. The skin layer 51 is formed of the epichlorohydrin rubber, which can have the same or similar composition to sample R1, described above.

In manufacturing the tubular member of Example 7, the THV and the sample rubber R1 were co-extrusion molded into a 2-layered molding. The resultant molding layer was further covered with the thread layer 5 and the skin layer 51 over outer periphery thereof. Finally, this structure was steam vulcanized. The resultant tubular member exhibited the same excellent adhesive strength and anti-permeability to gasoline as the molded layer of Example 1.

In order to minimize the cost, a chlorosulfonated polyethylene (CSM) or the like can replace the epichlorohydrin rubber (CHC) as the skin layer 51.

While the invention has been described with reference to examples, it is to be understood that modifications or variations may be easily made by a person of ordinary skill in the art without departing from the scope of this invention which is defined by the appended claims.

What is claimed is:

1. A layered molding comprising:

a rubber layer formed from a base polymer consisting essentially of at least one epichlorohydrin rubber, said rubber layer containing an organic phosphonium; and fluoroplastic layer disposed against and crosslinked with said rubber layer at an interfacial boundary positioned therebetween, said fluoroplastic layer consisting essentially of a copolymer composition that contains at least two precursors selected from the group consisting of hexafluoropropylene (HFP), tetrafluoroethylene (TFE), and vinylidene fluoride (VDF), wherein an amount of each precursor in the composition is selected within a range defined by plotting coordinates A, B, C, D, E, F, and G:

|   | HFP | TFE | VDF |
|---|-----|-----|-----|
| A: | 60  | 0   | 40  |
| B: | 40  | 25  | 35  |
| C: | 18  | 32  | 50  |
| D: | 25  | 0   | 75  |
| E: | 0   | 0   | 100 |

-continued

|   | HFP | TFE | VDF |
|---|-----|-----|-----|
| F: | 0   | 100 | 0   |
| G: | 100 | 0   | 0   |

2. A layered molding according to claim 1, wherein said layered molding is free of an adhesion agent.

3. A layered molding according to claim 1, wherein the organic phosphonium is phosphonium benzo triazolete or phosphonium tolyl triazolete.

4. A layered molding according to claim 2, further comprising a threaded layer and a second rubber layer, wherein said threaded layer is positioned adjacent said rubber layer and said second rubber layer is positioned adjacent said threaded layer such that said threaded layer is interposed between said rubber layer and said second rubber layer.

5. A layered molding comprising:

a rubber layer formed from a base polymer consisting essentially of at least one epichlorohydrin rubber;

an organic phosphonium layer; and a fluoroplastic layer crosslinked with said rubber layer, said fluoroplastic layer consisting essentially of a copolymer composition that contains at least two precursors selected from the group consisting of hexafluoropropylene (HFP), tetrafluoroethylene (TFE), and vinyliden fluoride (VDF), wherein an amount of each precursor in the composition is selected within a range defined by plotting coordinates A, B, C, D, E, F, and G:

|   | HFP | TFE | VDF |
|---|-----|-----|-----|
| A: | 60  | 0   | 40  |
| B: | 40  | 25  | 35  |
| C: | 18  | 32  | 50  |
| D: | 25  | 0   | 75  |
| E: | 0   | 0   | 100 |
| F: | 0   | 100 | 0   |
| G: | 100 | 0   | 0   |

6. A layered molding according to claim 5, wherein said layered molding is free of an adhesion agent.

7. A layered molding according to claim 5, wherein the organic phosphonium is phosphonium benzo triazolete or phosphonium tolyl triazolete.

8. A layered molding according to claim 6, further comprising a threaded layer and a second rubber layer, wherein said threaded layer is positioned adjacent said rubber layer, and said second rubber layer is positioned adjacent said threaded layer such that said threaded layer is interposed between said rubber layer and said second rubber layer.

9. A tubular member comprising a layer molding according to claim 1, wherein the rubber layer defines an inner annular layer having an outer surface, wherein the fluoroplastic layer defines an outer annular layer having an inner surface, and wherein the outer surface of the inner annular layer interfaces the inner surface of the outer annular layer.

10. A tubular member according to claim 9, further comprising a threaded layer disposed over said outer annular layer, and a second epiclorohydrine rubber layer surrounding said threaded layer.

11. A tubular member comprising a layer molding according to claim 5, wherein the rubber layer defines an inner annular layer, wherein the fluoroplastic layer defines an outer annular layer, and wherein the organic phosphonium layer is disposed between the inner and outer annular layers.

12. A tubular member according to claim 11, further comprising a threaded layer disposed over said outer annular layer, and a second epiclorohydrine rubber layer surrounding said threaded layer.

13. A layered molding according to claim 1, wherein the rubber layer defines an inner annular layer having an outer surface, wherein the fluoroplastic layer defines an outer annular layer having an inner surface, and wherein the outer surface of the inner annular layer interfaces the inner surface of the outer annular layer and thereby defines at least a portion of a tubular configuration of said layered molding.

14. A layered molding according to claim 13, further comprising a threaded layer disposed over said outer annular layer, and a second epichlorohydrin rubber layer surrounding said threaded layer.

15. A layered molding according to claim 5, wherein the rubber layer defines an inner annular layer, wherein the fluoroplastic layer defines an outer annular layer, and wherein the organic phosphonium layer is disposed between the inner and outer annular layers.

16. A layered molding according to claim 15, further comprising a threaded layer disposed over said outer annular layer, and a second epichlorohydrin rubber layer surrounding said threaded layer.

* * * * *